United States Patent
Gardner et al.

(10) Patent No.: US 10,725,638 B1
(45) Date of Patent: Jul. 28, 2020

(54) SYSTEM AND METHOD FOR CREATION OF MARKETING ANALYTIC DASHBOARDS

(71) Applicant: conDati, Inc., Palo Alto, CA (US)

(72) Inventors: Kenneth C. Gardner, Menlo Park, CA (US); Daniel J. Bartow, Temecula, CA (US); Christen Nguyen, San Jose, CA (US); Olivia Hsieh, Milpitas, CA (US); Matthew Koken, Sunnyvale, CA (US); Tejas Rao, Maynard, MA (US); Iris Lieuw, Seattle, WA (US); Phillip North, Seattle, WA (US)

(73) Assignee: CONDATI, INC., Palo Alto, CA (US)

( * ) Notice: Subject to any disclaimer, the term of this patent is extended or adjusted under 35 U.S.C. 154(b) by 0 days.

(21) Appl. No.: 16/409,370

(22) Filed: May 10, 2019

(51) Int. Cl.
*G06F 3/0484* (2013.01)
*G06F 3/0482* (2013.01)
*G06F 16/907* (2019.01)
*G06F 16/9035* (2019.01)
*G06F 16/957* (2019.01)

(52) U.S. Cl.
CPC ........ *G06F 3/04845* (2013.01); *G06F 3/0482* (2013.01); *G06F 16/907* (2019.01); *G06F 16/9035* (2019.01); *G06F 16/9577* (2019.01)

(58) Field of Classification Search
CPC ............... G06F 3/04845; G06F 16/907; G06F 16/9035; G06F 3/0482
See application file for complete search history.

(56) References Cited

U.S. PATENT DOCUMENTS

| | | | | |
|---|---|---|---|---|
| 9,292,625 | B2 * | 3/2016 | Tyagi | G06Q 10/06 |
| 10,380,770 | B2 * | 8/2019 | Stewart | G06F 3/0482 |
| 2012/0017165 | A1 * | 1/2012 | Gardner | H04L 41/22 715/771 |
| 2013/0110537 | A1 * | 5/2013 | Smith | G06Q 10/06 705/2 |
| 2014/0337808 | A1 * | 11/2014 | Armitage | G06T 11/60 715/864 |
| 2015/0067527 | A1 * | 3/2015 | Gardner | G06F 3/0482 715/739 |
| 2018/0005274 | A1 * | 1/2018 | Calvillo | G06F 16/9535 |

\* cited by examiner

*Primary Examiner* — Tadesse Hailu
(74) *Attorney, Agent, or Firm* — The Law Offices of Bradley J. Bereznak

(57) ABSTRACT

A computer-implemented method includes providing a graphical user interface (GUI) that allows a user working in a notebook computing system environment to generate a source notebook that includes a plurality of cells, each containing code, for the one or more visualizations each including a chart. The GUI allows the user to run the cells before creating the marketing analytic dashboard. The code used to generate the one or more visualizations into a custom dataframe is strung together into a custom dataframe, which is then paired with chart properties. Processing the pairs in an engine creates a preview of each visualization of the dashboard using campaign data of the customer. The marketing analytic dashboard is made available to the customer through a customer-facing marketing analytics application which performs the same processing as the engine to create visualizations on the dashboard using updated campaign data of the customer.

9 Claims, 15 Drawing Sheets

SYSTEM AND METHOD FOR CREATION OF MARKETING ANALYTIC DASHBOARDS

TECHNICAL FIELD

The present disclosure relates generally to the field of cloud computing as applied to business intelligence and data science on aggregated marketing data; more particularly, to systems and methods for creating analytic dashboards for large campaign data streams.

BACKGROUND

Advancements in computer architecture and digital networks over the past several decades have revolutionized marketing technology. For example, Google AdWords digital ad campaigns are commonly used by both small and large companies as an online advertising service that helps marketers reach their customers instantly. The advertisers pay to display brief advertising copy, product listings, and video content within the Google ad network to web users and targeted customers. Today, there is a wide variety of different cloud-based services (e.g., Google AdWords, Salesforce, Marketo, Cordial, DoubleClick, Facebook, YouTube, and other social media) that generate large campaign forecast data streams for ecommerce businesses.

In the next few years it is estimated that marketing spending will exceed $600 billion dollars, with a large share of that amount going to cloud-based marketing services. Large organizations and businesses have migrated to a robust set of marketing technology tools that are delivered over the Internet. These marketing tools generate a large amount of their own campaign data. It has become difficult to collect all of the marketing data for a particular customer or campaign which has been generated from many different cloud-based services, combine all of the cost, revenue, lead generation, etc., information results from all of the advertising activity, and present it to the customer in an insightful, easily comprehensible way.

As a result, marketing directors and CEOs are spending hundreds of millions of dollars annually on digital marketing programs without getting meaningful, quantifiable data on a granular level about which campaigns actually succeed. By way of example, even small companies that are set up for Google AdWords and Facebook ads may spend several million dollars on many thousands of different individual Google AdWords and Facebook ads without knowing which individual ads work and which do not. In other words, any one digital marketing ad campaign could be wasting large amounts of revenue, or generating huge returns without the company being aware of it.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

Figure 1:
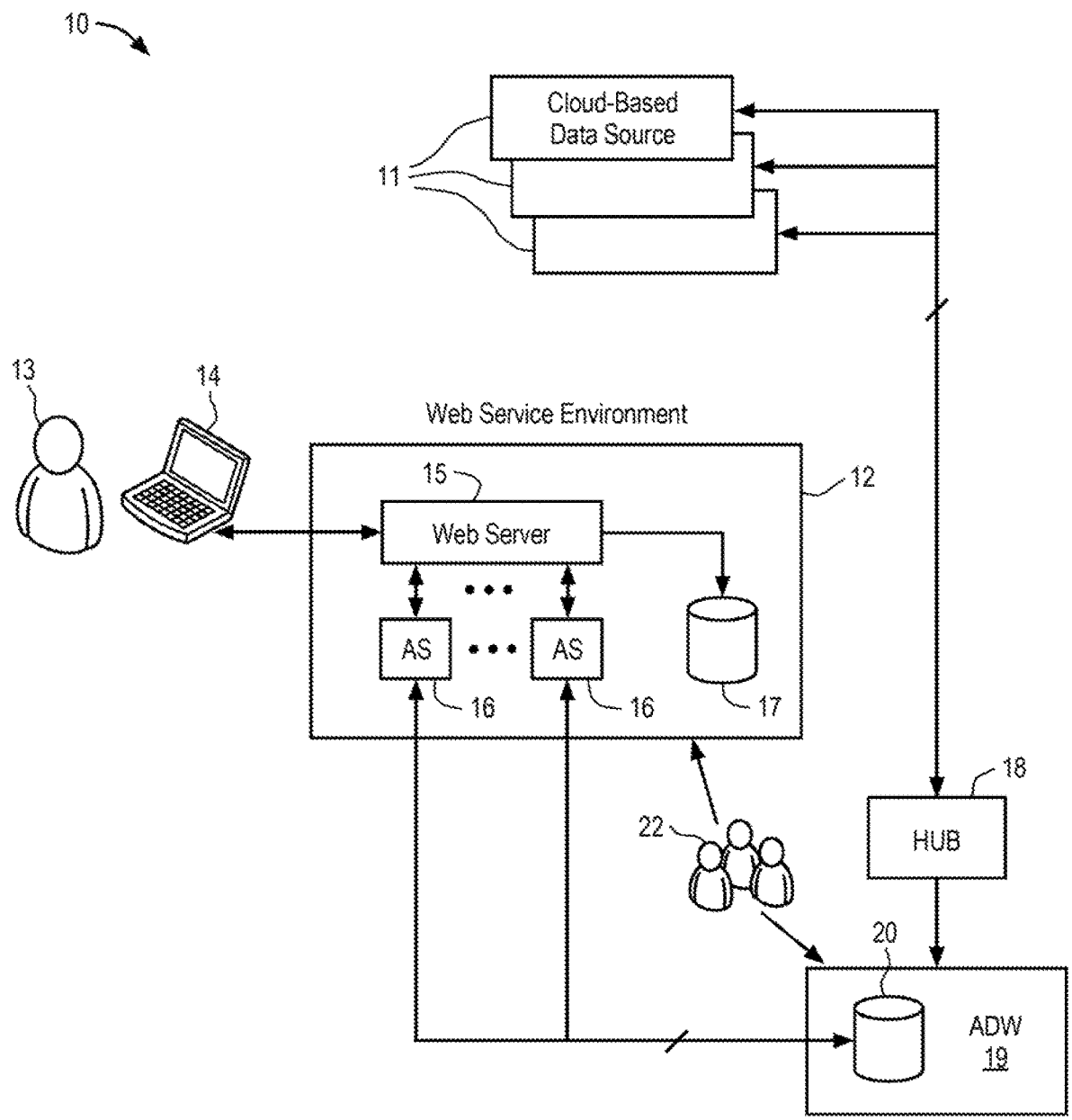
FIG. 1 is an example high-level architectural diagram illustrating a cloud-computing platform that provides visualized analytics for large campaign forecast data streams from multiple cloud sources.

In the following description specific details are set forth, such as data analysis platforms, method steps, algorithms, services, device types, implementations, etc., in order to provide a thorough understanding of the subject matter disclosed herein. However, persons having ordinary skill in the relevant arts will appreciate that these specific details may not be needed to practice the present invention. It should also be understood that the elements in the FIGS. are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure.

The term "server" broadly refers to any combination of hardware or software embodied in a computer designed to provide services to client devices or processes. A server therefore can refer to a computer that runs a server operating system from computer-executable code stored in a memory, and which is provided to the user as a virtualized or non-virtualized machine; it can also refer to any software or dedicated hardware capable of providing computing services. A web server is an information technology that processes requests via HTTP, the basic protocol used to distribute information on the World Wide Web. A webpage is a web document that is suitable for the World Wide Web. A web browser running on a client or user computing device displays a web page on a monitor or mobile device screen.

In the context of the present disclosure, Amazon Elastic Compute Cloud (Amazon EC2, or EC2 for short) is an Amazon web service (AWS) that provides secure, resizable compute capacity in the cloud. It is designed to make web-scale cloud computing easier for developers. Amazon EC2's web service interface allows a user to obtain and configure a server in the cloud quickly and without friction. Similarly, Amazon Simple Queue Service (Amazon SQS) is a pay-per-use web service for storing messages in transit between computers. Developers and scientists may use SQS to build distributed applications with decoupled components without the overhead of creating and maintaining message queues. Lambda™ is an event-driven computing cloud service from AWS that allows developers to program functions on a pay-per-use basis without having to provision storage or compute resources to support them.

Amazon CloudWatch™ is an AWS component designed to monitor AWS cloud resources and hosted applications. Amazon Simple Storage Service (S3) is a scalable, web-based cloud storage service designed for online backup and archiving of data and applications on Amazon Web Services. S3 has a relatively simple web service interface that can be used to store and retrieve any amount of data, at any time, from anywhere on the web.

The term "real-time" refers to a level of computer responsiveness that a user senses as sufficiently immediate or that enables the computer to keep up with some external process (for example, to present visualizations of collected sessions that constantly change responsive to new campaign data). Thus, real-time is a mode of computer operation in which the computer collects data, analyzes or computes with the data, reports (e.g., visually displays) and/or stores the results nearly simultaneously, i.e., within milliseconds or a few seconds (e.g., 1-10 seconds) of measurements being communicated over a network (wired or wireless), or uploaded from a database, to a server.

A "mouseover" or "mouse hover" is computer function in which one or more images or hyperlinks may be generated or activated when a user moves or "hovers" the cursor or pointer over at least one of a node, duster or link appearing in a web browser window, usually with a mouse, but also possible using a digital pen or touch command.

In the context of the present application, a "widget" refers to an element of a GUI that allows a user to interact with an application and/or operating system. Widgets display information and invite the user to act in a number of ways. Widgets may include buttons, dialog boxes, pop-up windows, selection boxes, windows, toggle switches, checkboxes, tabs, forms, etc. The term widget also can be used to refer to either the graphic component or its controlling program or a combination of both.

In one embodiment, an architecture/platform for dashboard creation is provided that allows data scientists to convert large campaign data visualizations they create in a Jupyter Notebook environment to a customer-facing marketing analytic dashboard server, also referred to herein as a conDati™ Analytic (CDA) dashboard product or service. The Jupyter Notebook is an interactive computing environment that enables users to author notebook documents that include live code, interactive widgets, plots, narrative text, equations, images and video. The Jupyter Notebook combines three components: (1) a notebook web application for writing and running code interactively and authoring notebook documents; (2) kernels, which are separate processes started by the notebook web application that runs users' code in a given language and returns output back to the notebook web application. The kernel also handles things like computations for interactive widgets, tab completion and introspection; and (3) notebook documents, which are self-contained documents that contain a representation of all content visible in the notebook web application, including inputs and outputs of the computations, narrative text, equations, images, and rich media representations of objects. Typically, each notebook document has its own kernel.

Persons of skill in the art will appreciate that the CDA platform provides marketing executives and practitioners with a portfolio of cloud-based, purpose-built notebooks that address specific domains of marketing operations, performance and contribution.

In one embodiment, a graphical user interface (GUI) allows one or more data scientists working in a notebook computing system environment to write code, create data science/structures, set variables, perform mathematical calculations and generate visualization results. All of that is then transferred into a separate cloud-based system, which is a CDA product or service. Stated differently, an architectural platform is provided that allows data scientists working in a specific computing environment to build software components for generating marketing visualizations, which is then transformed and pushed into a completely different customer-facing dashboard analytics product.

Importantly, the CDA product does not make the customer create their own dashboards; rather, the visualizations are created and stored in the notebook environment as code. That code is input to a CDA product having a GUI that provides an intuitive dashboard navigator environment that allows a user to quickly and easily select and access any one of a plurality of different dashboards.

In one embodiment of the dashboard navigator, dashboards are visually represented as cards, with a screenshot of the actual dashboard appearing in a GUI window as a thumbnail image to cue the user to identify which dashboard it is, with a title and description appearing over the dashboard image in response to a hover or mouseover event.

In addition, in one embodiment, dashboard thumbnail images are organized into various groups or categories, such as "Favorites", or with arbitrary or custom tags. These groups of dashboard thumbnail images are arranged in stacks that are similar to a spread stack of playing cards, with each dashboard being slightly offset in position on the screen with respect to its nearest neighbors. The GUI allows a user to drill into each of these stacks when navigating in the dashboard navigator environment. In one embodiment, the GUI allows the user to quickly drill down to a single desired dashboard, as well as back up to the main dashboard navigator screen.

FIG. 1 is an example high-level architectural diagram illustrating a cloud-computing platform or computing environment 10 that provides visualized analytics for large campaign forecast data streams from multiple cloud sources. As shown, one or more data scientists 22 are shown working in a notebook environment in which they write code in the form of input cells, which when executed, produce output cells. The output may then be used to generate a particular dashboard layout having specific data visualizations that provide business intelligence for a particular customer. In a serial, single-threaded manner, data scientists 22 may create data science/algorithms, data structures, set variables, perform mathematical operations, and produce results.

A customer or user 13 may connect to the front-end of a cloud-based web service environment 12 via a laptop computer 14. It is appreciated that in other implementations, computer 14 may comprise a desktop computer, workstation, or other computing device that connects with a web server 15. Web server 15 provides a graphical user interface (GUI) that allows a user to access and select a particular dashboard visualization using the customer's large campaign marketing data obtained from a plurality of cloud-based data sources 11.

In one embodiment, web service environment 12 is an Amazon Web Services (AWS) environment that provisions web server 15, application servers 16 and a database 17 that stores the data and computer program that generates the dashboard visualizations provided to customer 13. In the example shown, web server 15 is a virtual machine deployed in AWS environment 12 that communicates with a browser application running on computer 14. For security reasons, a different AWS environment or customer environment is provided for each customer of the CDA product or service.

Persons of skill in the art will understand that the software program which runs on web server 15 to generate the dashboard visualizations and visual tools described in the various embodiments may also be downloaded to the user's laptop computer 14 or implemented on a separate hardware appliance unit located either at the user's premises (e.g., behind the firewall) or anywhere in a cloud environment.

Continuing with the example of FIG. 1, the application program running on web server 15 operates to create a graphical user interface (GUI) that allows a user of laptop 14 to remotely interact with the application to generate the dashboard visualizations described herein. For instance, when user 13 opens their browser on laptop 14 and logs into web server 15 to execute the program for accessing and selecting a particular dashboard, the computer program may cause application servers 16 to pull in large campaign forecast data/data streams stored in a database 20 of Analytic Data Warehouse (ADW) 19.

As shown, a plurality of cloud-based data sources 11 are connected to a hub 18 (e.g., a server) that functions to ingest and process data/data streams provided by various cloud-based data sources 11. By way of example, cloud-based data sources 11 may include Google AdWords, Google Analytics, Salesforce, Marketo, Cordial, Facebook ads, Hubspot, Success Factor, YouTube ads, etc. Using the credentials of customer 13, hub 18 accesses the data of sources 11 using the appropriate application programming interface (API) to ingest the large volumes of marketing data provided by each source 11. In one embodiment, hub 18 processes or blends the data and then loads the blended data into database 20 of ADW 19. Persons of skill in the art will understand that blending or harmonizing data is a process of combining large amounts of data from multiple sources which are integrated and merged into a single functional data warehouse or dataset. Data blending allows business analysts to cope with the expansion of data which they may need to make critical business decisions based on quality business intelligence.

In one implementation, the data and data models stored in database 20 may include large amounts of historical data and/or live data streams provided in real-time from cloud-based data sources 11. The data stored in database 20 is used to generate the dashboard visualizations described herein. In a specific embodiment, ADW 19 is a Snowflake™ analytic data warehouse provided as Software-as-a-Service (SaaS). The Snowflake data warehouse uses a SQL database engine with an architecture designed to run in a public cloud infrastructure.

Figure 2:
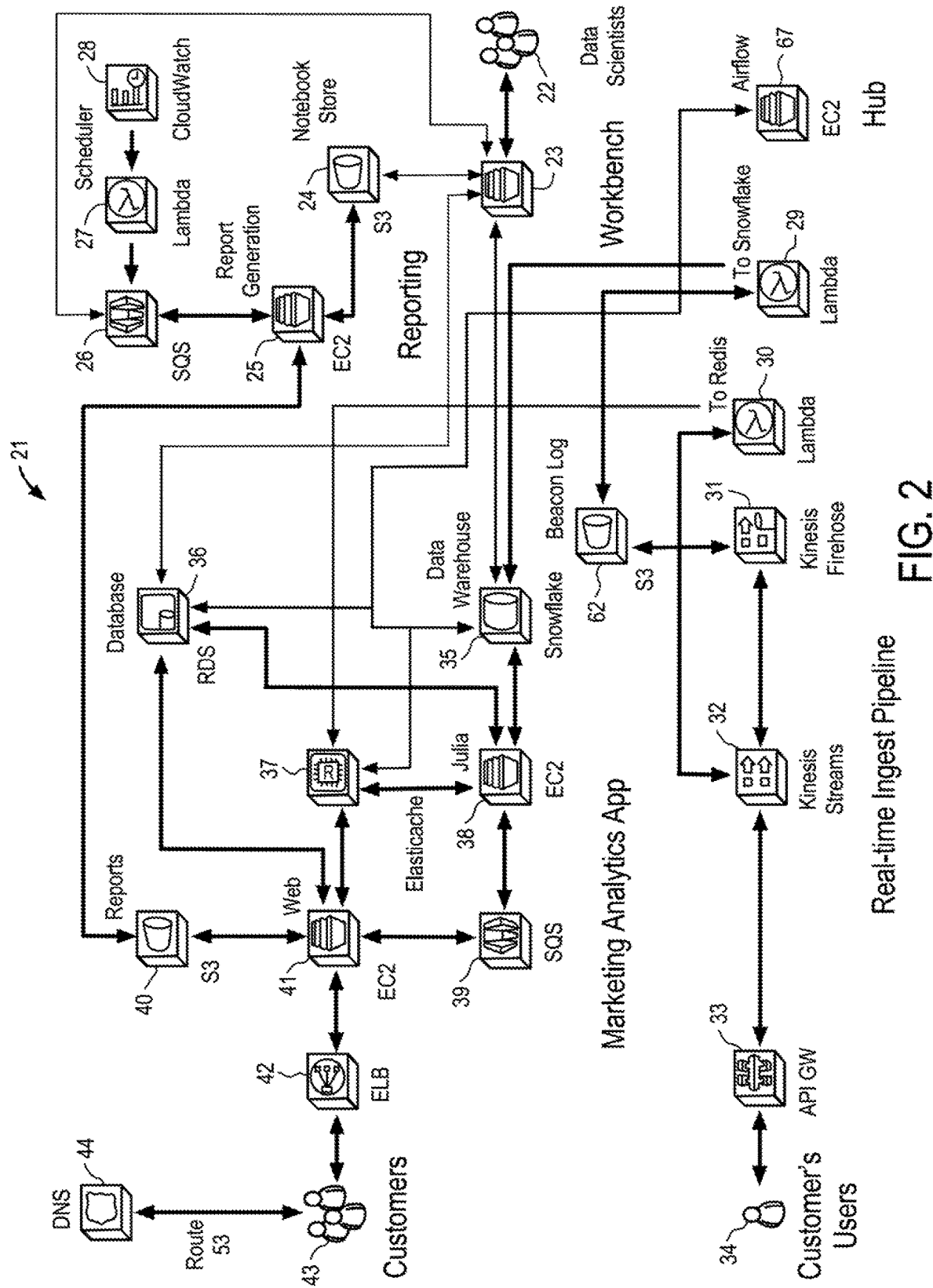
FIG. 2 is a more detailed example architectural diagram illustrating a cloud-computing platform that provides a data scientific computing environment at one end for creating visualizations which are transferred to a content-sharing and visualization analytic product at the other end.

FIG. 2 is a more detailed example architectural diagram illustrating a cloud-computing platform 21 that provides a data scientific computing (workbench) environment at one end for creating visualizations which are transferred to a content-sharing and visualization analytic product at the other end. As shown, one or more data scientists 22 are associated with server 23, which, in one embodiment is a multi-user server that manages and proxies multiple instances of a single-user Jupyter notebook server. In one embodiment, server 22 includes a suite of data management, data science, and software development tools (known as conDati™ Workbench (CDWB)) that may be used to integrate and analyze large data volumes from multiple systems, retrieve and combine data from a wide variety of marketing systems. CDWB also includes machine learning algorithms, statistics, and analytic approaches applied to different problems in marketing.

The code that is written by data scientists 22 for creating new dashboard visualizations is stored in analytic data warehouse 35, which, in one embodiment is a Snowflake data warehouse. The code, data structures and data science generated by scientists 22 may also be stored in notebook store 24. Notebook store 24 is part of the Reporting section of platform 21, which includes report generation server 25, SQS 26, Lambda server 27 and CloudWatch server 28. CloudWatch is a monitoring service for AWS cloud resources and the applications that run on AWS. Amazon CloudWatch is used to collect and track metrics, collect and monitor log files, set alarms, and automatically react to changes in AWS resources.

Reports generated in server 25 may delivered to storage device 40 which is connected to web-facing server 41. Server 41 interfaces with Elastic Load Balancing (ELB) service 42 is a load-balancing service for AWS deployments. ELB service 42 automatically distributes incoming application traffic and scales resources to meet traffic demands. ELB service 42 provides an interface for customers 43 to communicate with server 41, as well as the other components of platform 21. Customers 43 are shown connected with a data source name (DSN) component 44. Persons of skill in the art will understand that DSN 44 is provides a data structure that contains the information about a specific database that an Open Database Connectivity (ODBC) driver needs in order to connect to it. A user DSN allows database access for a single user on a single computer, and a system DSN for any user of a particular computer.

Server 41, SQS 39, database 37 and server 38 comprise the customer-facing marketing analytics application (i.e., CDA product/service) that provides the GUI and dashboard visualizations accessible to customers 43. In the embodiment of FIG. 2, database 37 is a Redis in-memory data structure store. In one embodiment, server 38 is configured to run Julia, which is a high-level general-purpose dynamic programming language that was originally designed to address the needs of high-performance numerical analysis and computational science, without the typical need of separate compilation to be fast, also usable for client and server web use. In operation, server 38 converts the visualizations from a Jupyter notebook in the workbench section of platform 21 to a customer-facing dashboard generated by web server 41.

An Amazon Relational Database Service (RDS) 36 is also shown being connected with servers 41 and 38. RDS 36 is a managed database service that allows the use of various relational database services in a hosted environment and allows controlled access to the database for the customer-facing environments that require it.

Continuing with the example of FIG. 2, the customer's users 34 interface with the Real-Time Ingest Pipeline section of platform 21 via an API gateway 33. Users 34 responding to large marketing ad campaigns run by multiple cloud-based data sources produce large data streams ingested by Kinesis Data Streams server 32. Component 32 collects and processes large streams of data records in real-time. A Kinesis Data Streams application reads data from a data stream as data records. The processed records can be sent to dashboards or sent to a variety of other AWS services.

As shown, Kinesis Data Streams server 32 is connected with Kinesis Firehose server 31 and Lambda server 29, both of which are connected to a beacon log database 62. Amazon Kinesis Data Firehose is a fully managed service for delivering real-time streaming data to destinations such as Amazon Simple Storage Service (S3). Lambda server 29 and Hub server 67 are both shown connected to analytics data warehouse 35. In one embodiment, Hub server 67 runs Apache Airflow™, which is an open-source tool for orchestrating complex computational workflows and data processing pipelines.

Figure 3:
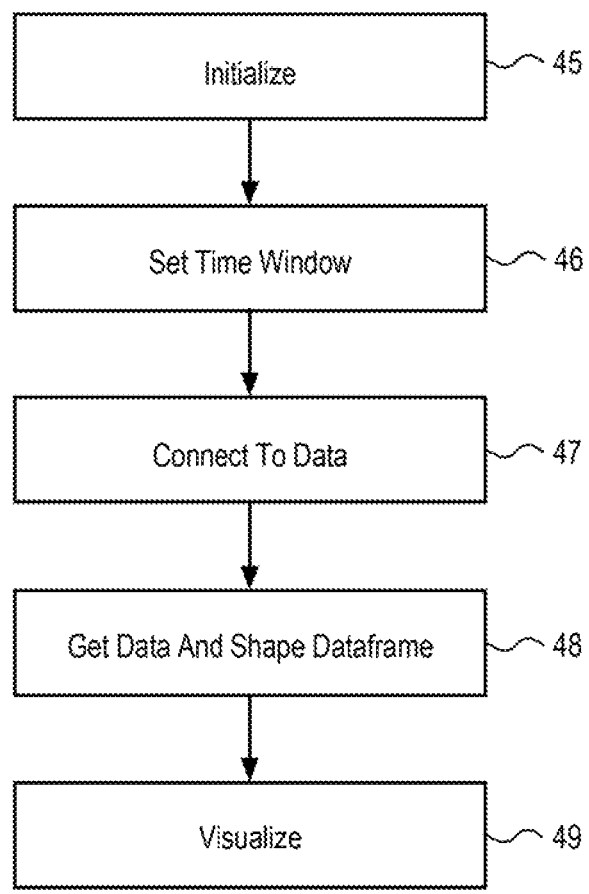
FIG. 3 is an example flow diagram of a process for creating a dashboard in accordance with the architecture shown in FIG. 2.

FIG. 3 is example flow diagram of a process for creating a dashboard via in accordance with the architecture shown in FIG. 2 utilizing a graphical user interface (GUI). In order to create a dashboard, a source notebook is first created. One or more data scientists create a notebook that first imports a CDWB software module that contains functions used to manipulate data and draw charts. The system is initialized (Block 45) and a time window is set (Block 46). The time window sets the start and end times of the large campaign data collected, which data will be used in the analytic dashboard visualization. For instance, the time window may be for any arbitrary time period, e.g., one day, one week, one month or longer. Next, a connection is made to a particular customer's data (Block 47) which, in one embodiment, is stored in a SnowFlake ADW. Computations are performed on the customer's data to generate a dataframe (Block 48), which is passed into a draw function used to create the visualizations for the customer. (Block 48)

Persons of skill in the art understand that text can be added to Jupyter notebooks using markdown cells. Markdown is a popular markup language that is a superset of HyperText Markup Language (HTML). It is appreciated that the source notebook has to have all of the required markdown cells and adhere to rules on syntax. The source notebook also has to include one or more visualizations. One or more of the data scientist in the workbench environment should run all of the cells in the notebook before they create a given dashboard. Running the cells creates the visualizations within the notebook and also pushes properties of each chart to a global variable that is used in the dashboard that is accessible to the customer.

Figure 4:
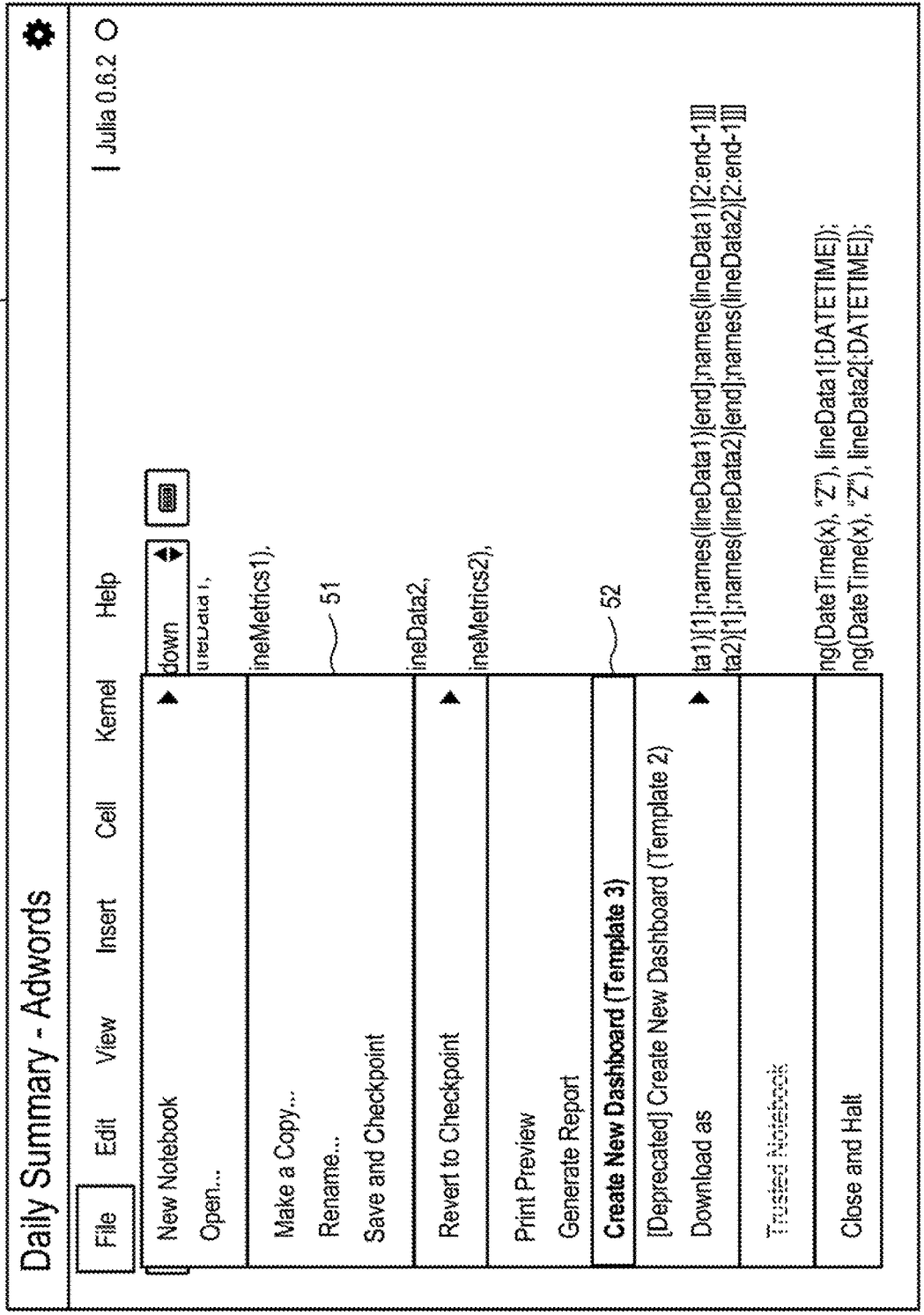
FIG. 4 is an example graphical user interface window that illustrates selection of the option to create a new dashboard.

FIG. 4 is an example GUI window 50 that allows a data scientist or user to select the option of creating a new dashboard. As shown, the user clicks on the "File" tab which causes a dropdown menu 51 to appear. In this example, the user has positioned the cursor to select "Create New Dashboard (Template 3)" box 52. Clicking on box 52 causes a new dialog to appear, which shows further options for creating a dashboard.

Figure 5:
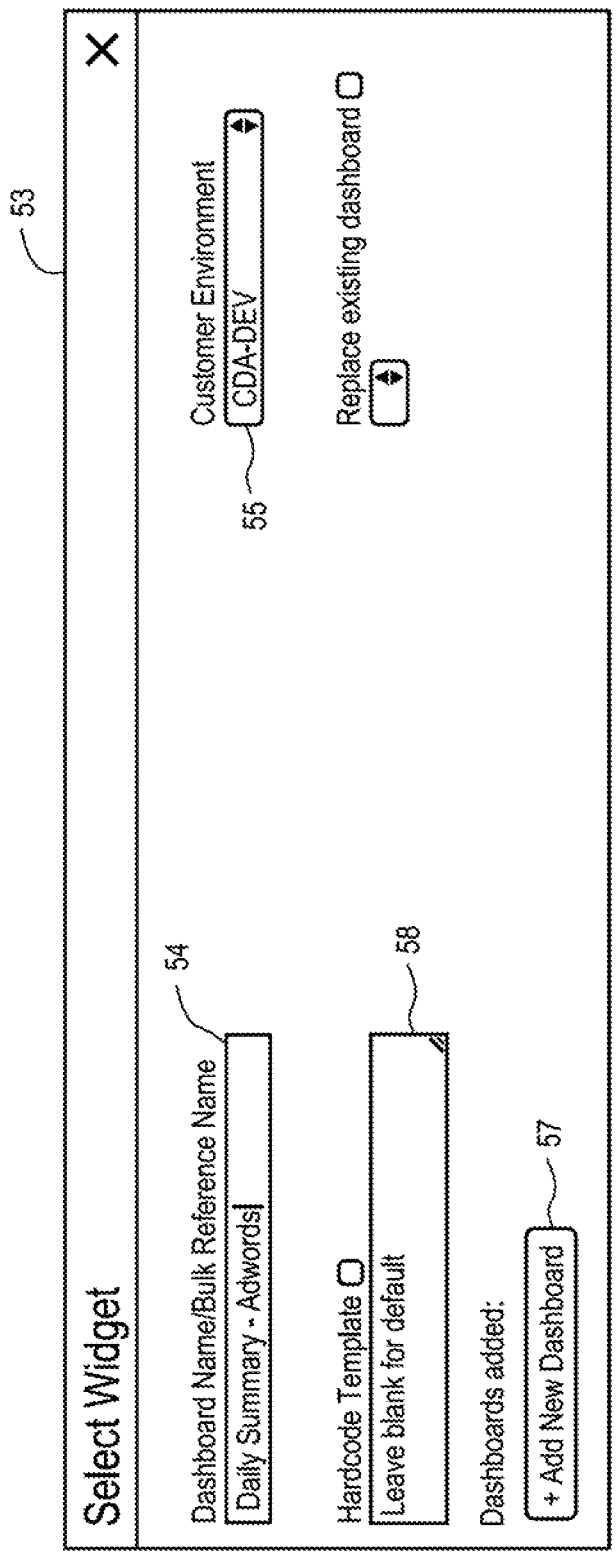
FIG. 5 is an example graphical user interface window that illustrates a select widget that allows a user to specify various attributes of a new dashboard.

FIG. 5 is an example graphical user interface window 53 that allows a user to specify various attributes/widgets of a new dashboard. Text field 54 allows a user to specify a name for the dashboard. This is the name that will appear in the dashboard list in CDA shown to the customer. In the event that a user is creating a group of dashboards, then the name entered in field 54 designates the group name, which refers to the group in the Aurora table. An Aurora table is a data structure used to organize information. Persons of skill in the art will understand that Amazon Aurora is a relational database engine from Amazon Web Services. The engine is compatible with MySQL, which means code, applications and drivers used in databases relying on MySQL can be used in Aurora with minimal or no changes.

Figure 6:
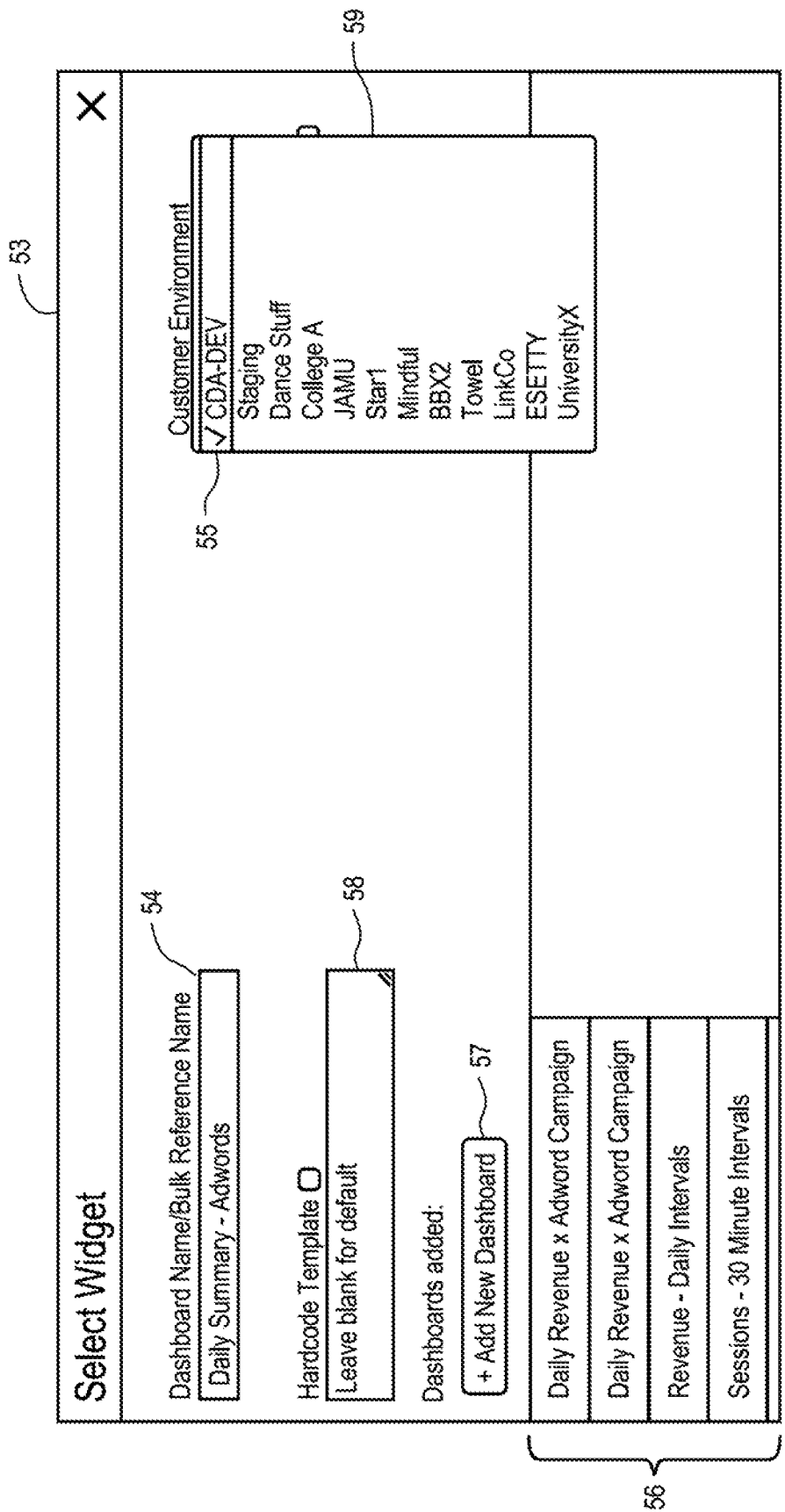
FIG. 6 illustrates the example graphical user interface of FIG. 5 with a dropdown list of customers and a field showing a set of existing widgets.

Window 53 also includes a customer environment field 55, which has a dropdown feature that allows a user to select the destination for the dashboard. This feature is shown in FIG. 6. Included in the list are CDA testing environments as well as actual customers. This field is used to look up and select the customer's Aurora table and DSN information to eventually store the dashboard entry. As shown in the examples of FIGS. 5 & 6, the customer environment selected in field 55 is a CDA development environment (CDA-DEV).

As shown in FIG. 6, window 53 includes a sidebar field 56 containing all of the visualizations from the notebook, which visualizations correspond to the number of charts under the "Visualize" markdown cell in the notebook. Window 53 also includes a hardcode template field 59 and an "Add New Dashboard" button 57. By selecting the checkbox above field 58, users indicate that they would like to specify and overwrite the default layout that the widgets will be configured in a dashboard. In CDA, based on the number of widgets, a software program functions to determine a grid that provides a best fit arrangement of all widgets. In certain instances, a data scientist wants to arrange the widgets to their own specification, so they can define it in field 58 using a Cascading Style Sheets (CSS) grid template string. Cascading style sheets are used to format the layout of Web pages. For example, CSS can be used to define the cell padding of table cells, the style, thickness, and color of a table's border, and the padding around images or other objects.

Figure 7:
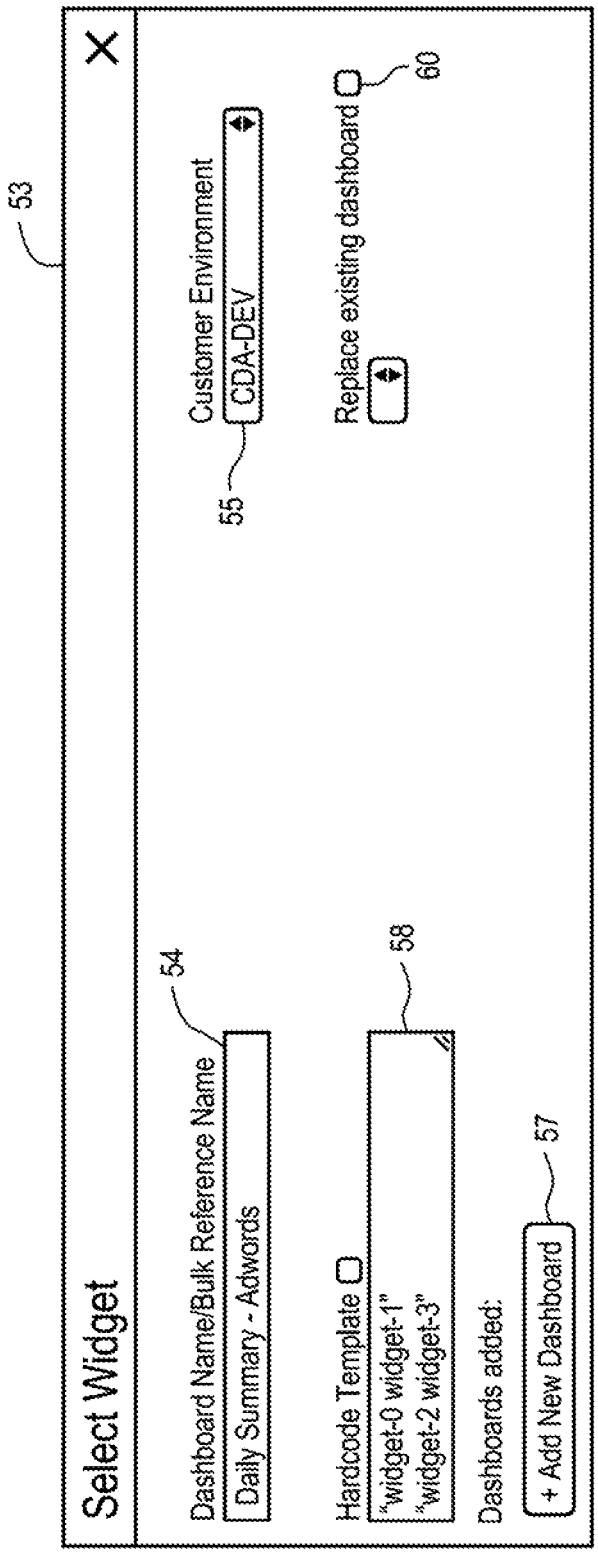
FIG. 7 is another example graphical user interface window showing a hardcode template field specifying the layout of the widgets.
Figure 8:
FIG. 8 is yet another example graphical user interface window that illustrates a dropdown list of existing dashboards for replacement.

FIG. 7 shows window 53 with field 58 including widget-0, widget-1, widget-2, and widget-3. The example of FIG. 7 also illustrates a "Replace existing dashboard" checkbox 60. By selecting this checkbox a user indicates that they wish to replace an existing dashboard with the new dashboard. Replacing a dashboard replaces the existing one with whatever new title is provided and whatever dashboard content is changed. The row entry in the table itself is just updated so the ID as well as description, thumbnail, metadata, etc. remain the same. This dropdown, which is shown in FIG. 8, is linked to the customer environment dropdown. Depending on what customer is selected, a request is made to dynamically populate the dashboard dropdown to show all dashboards in the selected environment. In the example shown in FIG. 8, CDA-DEV is selected so the dropdown list 61 of dashboards to replace is the full list of dashboards.

Figure 9:
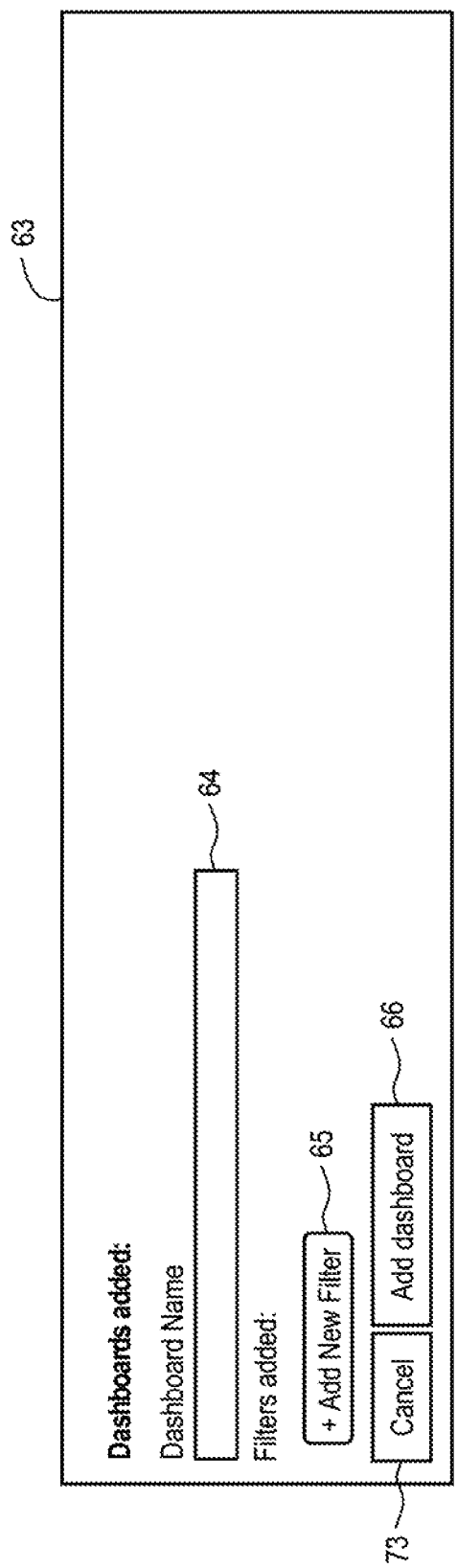
FIG. 9 is still another example graphical user interface window that shows various fields and buttons for adding multiple dashboards and filtering.

The "Add New Dashboard" button 57 allows a user the option to make a group of dashboards based off of a single notebook. By clicking on or selecting button 57, a new window form 63 appears, as shown in FIG. 9. This form allows the user to add one new dashboard at a time with corresponding filters. Window 63 includes a dashboard name field 64, and "Add New Filter" button 65, an "Add Dashboard" button 66, and a "Cancel" button 73. The first step is to specify a dashboard name in field 64. After that, a user can add as many filters as they wish to the dashboard by clicking on button 65. Filters get passed through to a dashboard like a variable in order to make the single notebook more flexible. Depending on how the data scientist writes the notebook, it could take as many filters as possible ranging from what data science model to use, data range to extrapolate data on, campaigns to observe, etc.

Figure 10:
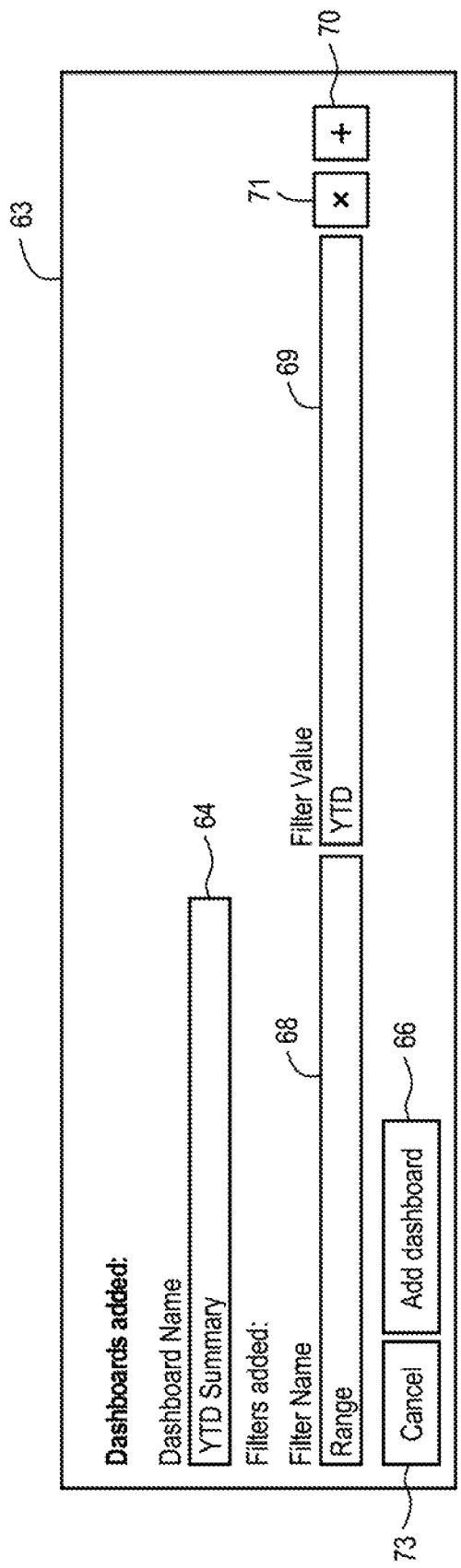
FIG. 10 is the example graphical user interface window of FIG. 9 following user input to add a filter name and filter value.
Figure 11:
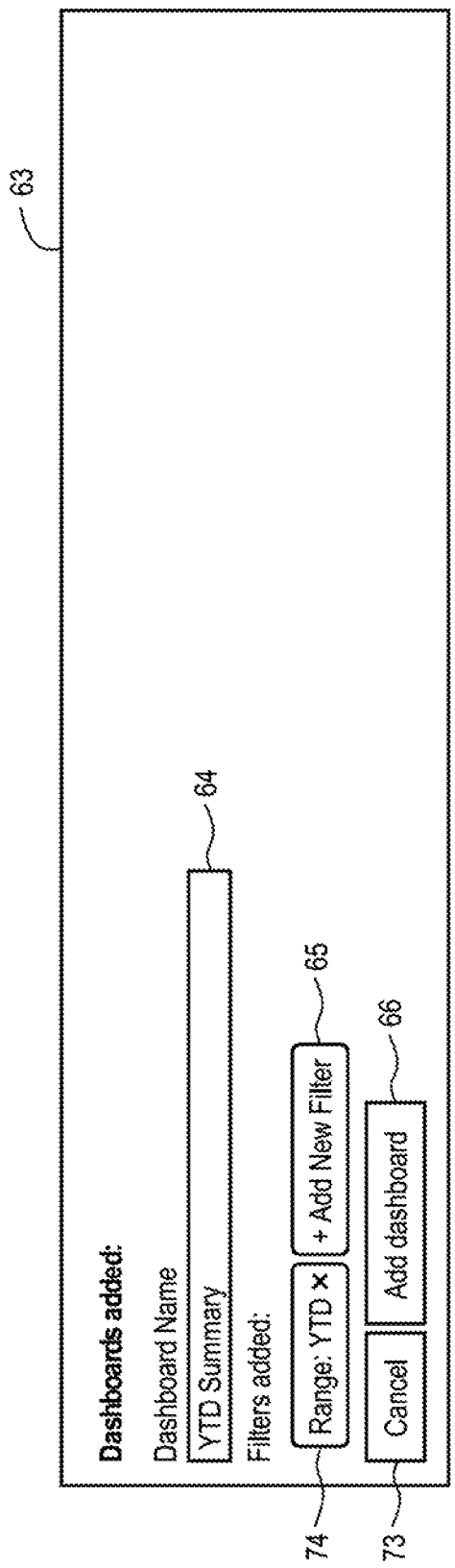
FIG. 11 is the example graphical user interface window of FIG. 10 following addition of a filter.

Upon clicking button 65, addition text fields appear which allow the user to enter values for the name of the filter and its respective value. These additional fields, as shown in FIG. 10, include a filter name field 68, a filter value field 69 and "x" and "+" buttons 71 and 70, respectively. By clicking add (+) button 70, the user can continue to add more filters. The added filter appears in a list of chips. By way of example, FIG. 11 shows the added filter in chip 74 of window 63 showing the filter name (e.g., Range) and the filter value (e.g., YTD). The user can also deleted added filters from the list by selecting the filter to be deleted and clicking on the delete (x) button 71.

Figure 12:
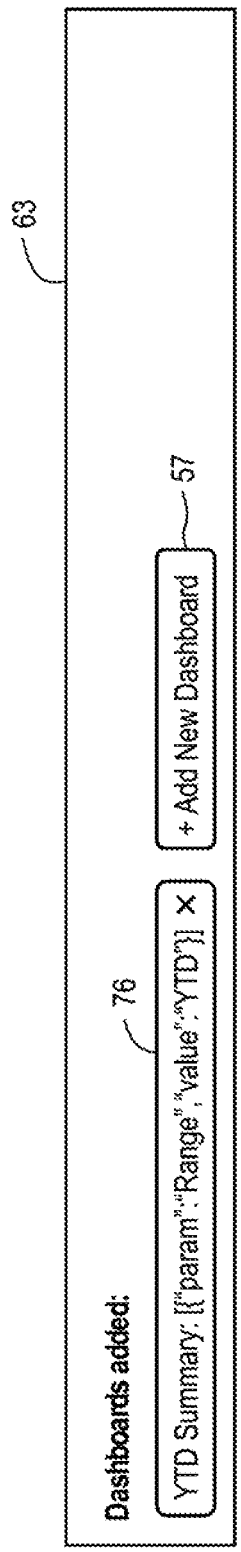
FIG. 12 is an example graphical user interface window following user input to confirm the addition of a new dashboard and the array of filters related to the dashboard.

When the user is finished adding filters to the dashboard they can confirm the addition of this dashboard by clicking Add dashboard button 66. The user may also select Cancel button 73 if they do not wish to add the additional dashboard. Upon adding the dashboard, a dashboard chip 76 appears in window 63 showing the new dashboard name (e.g., YTD Summary) as well as the array of filters related to the dashboard (e.g., {"param"; "Range"; "value"; "YTD"}), as shown in FIG. 12. Dashboard chip 76 can be deleted, if the user wishes, by clicking on the "X" inside chip 76.

Figure 13:
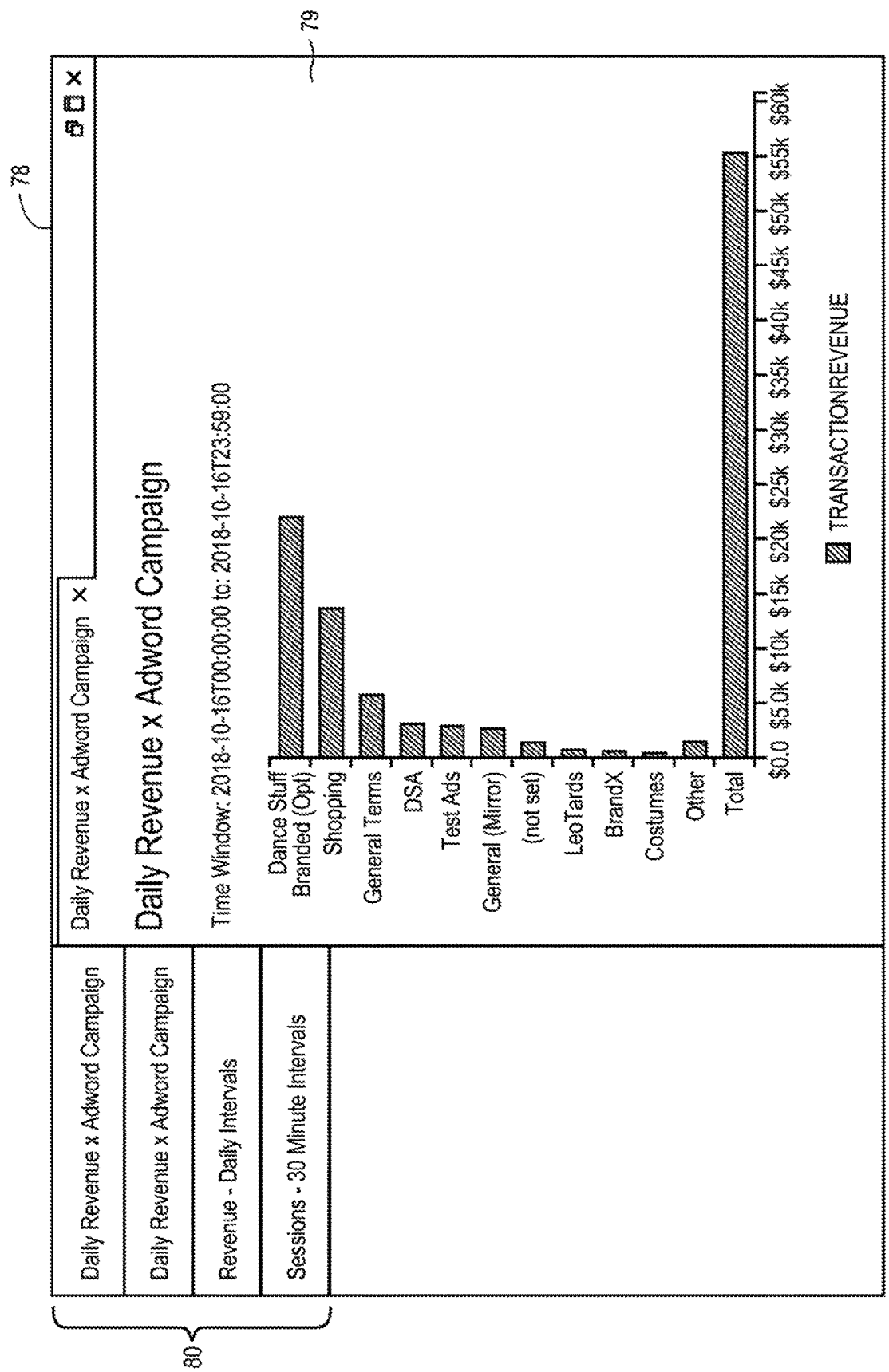
FIG. 13 is an example graphical user interface window that includes a sidebar containing visualizations from a notebook that populate a dashboard preview.

FIG. 13 is another example GUI window 78 with a sidebar field 80 containing all of the visualizations from the notebook. The number of visualizations corresponds to the number of charts under the "Visualize" markdown cell in the notebook. As discussed above, running the cells creates a global variable containing each chart's properties. Among these properties is the chart title for each chart. This is used to populate sidebar field 80 where the titles of each chart are clearly shown. The order that the user arranges the charts determines how they will be ordered later as a dashboard in CDA. Upon clicking on a widget in sidebar field 80, a new tab appears in the preview field 79 and a dashboard preview is shown populated. In this example, daily revenue is plotted for a number of different AdWord campaigns of a particular customer. Persons of skill in the art will appreciate that what happens in the preview field 79 is supposed to mimic what will occur in CDA. In this manner, a user or scientist can ensure that a particular widget will work as intended in CDA in a real customer's environment.

It should be understood that all the code prior to the visualization markdown cell is strung together (i.e., concatenated) as a whole code block. This is referred to as the custom dataframe (or customDF) because all the code here is required to shape a dataframe that will be passed to the draw function. The customDF is saved and paired with the chart properties associated with each visualization. Each of these pairs, along with some additional parameters that may be added, is processed by the Julia engine (see FIG. 2). This same processing happens in CDA to show a particular dashboard. The Julia engine returns all the chart properties calculated based off of the customDF and chart information passed along to it. This is done in order to get brand new data and update any dynamic parts to the chart based on recently obtained new data. In the end, by seeing the dashboard preview, data scientists can confirm that the dashboard will work in CDA because it is being processed by the same Julia processor engine.

Figure 14:
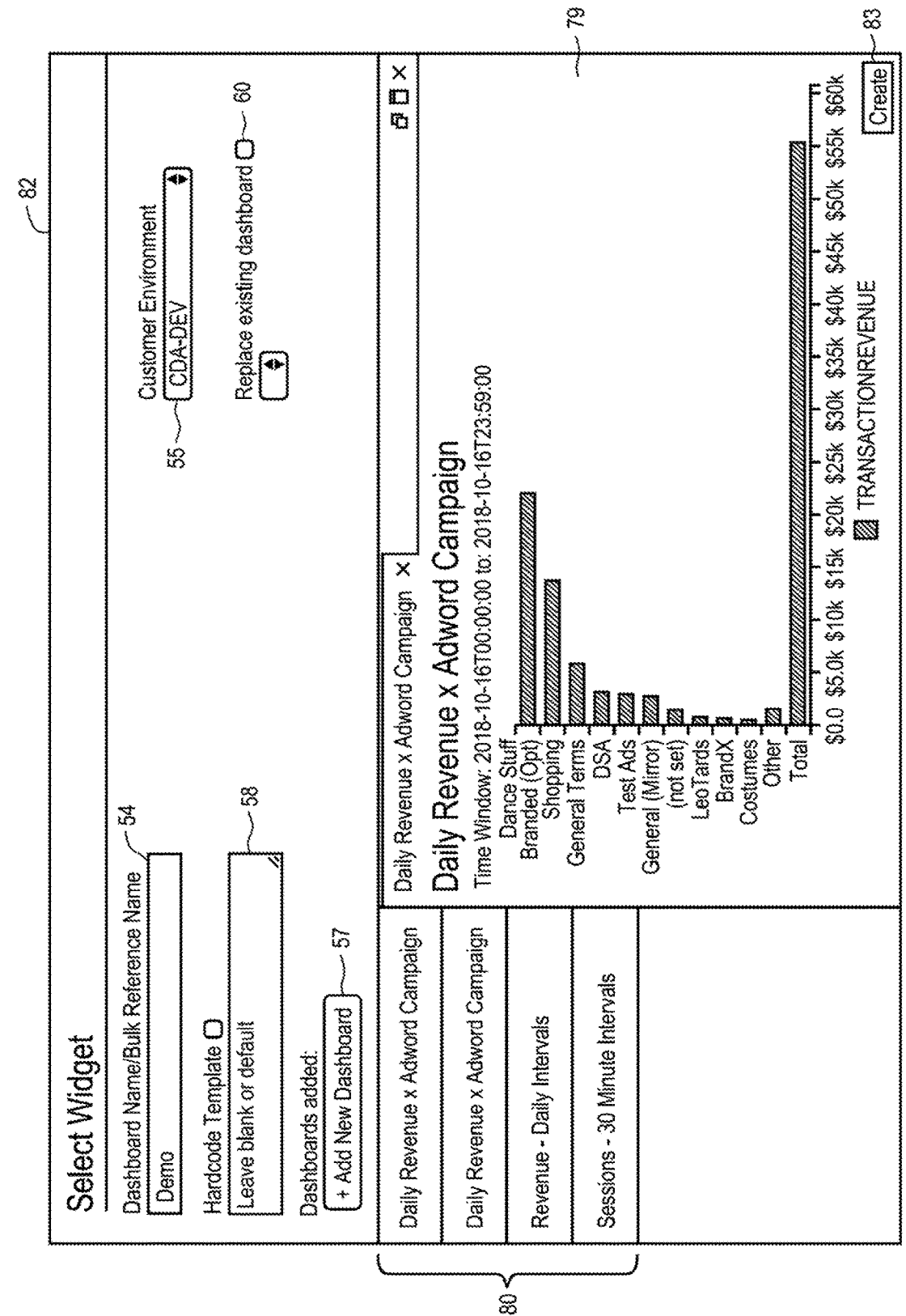
FIG. 14 is an example graphical user interface window that allows user input to confirm the addition of a new dashboard and the array of filters related to the dashboard.

Once all widgets have been selected and deemed to be operable and safe for use by customers, the user may click on a "Create" button. Create button 83 is shown in FIG. 14 in the bottom right-hand corner of GUI window 82. In one embodiment, the user may be prompted by the GUI about the action they are trying to perform, and asked to confirm that they want to follow through with the action. For instance, in response to clicking on create button 83 the GUI may display a dialog box asking if the user is sure they want to create a dashboard named "Demo" for customer CDA-DEV. In response to the prompt the user may either click on an "OK" button or a "Cancel" button.

If the user clicks OK, a confirmation screen will appear to inform the user that the dashboard was successfully created. This action by the user causes the GUI to send a request containing all of the dashboard information, including the dashboard name, the customDF and chart property pairs, and other information related to customizing the dashboard to a processor (server) that processes the request and inserts all of the dashboard information in the particular customer's Aurora table.

In the CDA portion of the architecture a processor/server (e.g., server 41 in FIG. 2) accesses the customer's Aurora table and creates a dashboard link for each entry (row) in the table. When a dashboard is selected by the user, it uses its ID number to query the table for the dashboard information. The processor/server receives the dashboard metadata as well as all of the customDF and chart property pairs. For each widget, it will make a request to the Julia engine (e.g., server 38 in FIG. 2) to process the data. For each request, chart properties are returned, which are then used by CDA to display the one or more visualizations.

Figure 15:
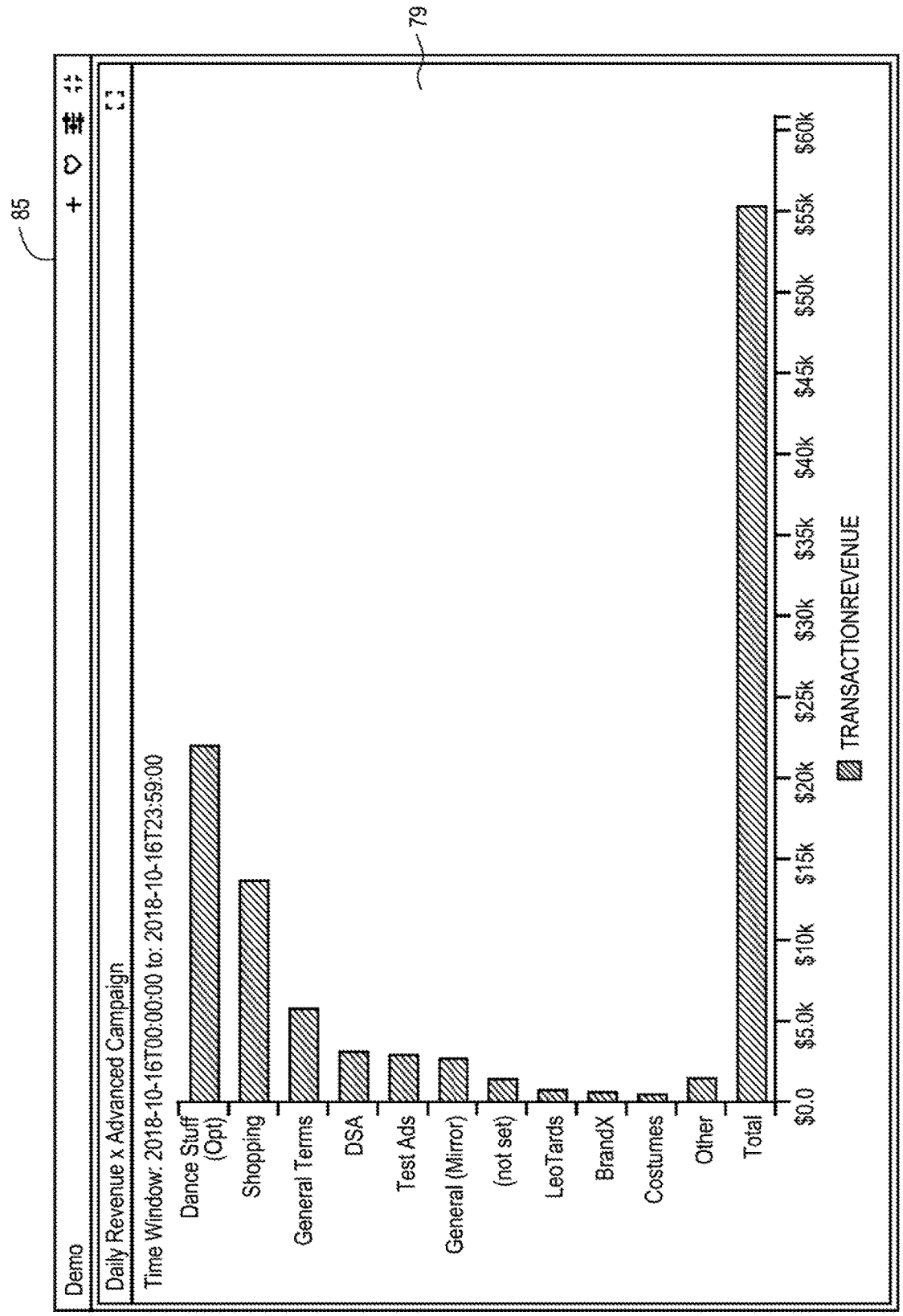
FIG. 15 is an example graphical user interface window showing a dashboard visualization created for a customer by a marketing analytic application.

FIG. 15 is an example GUI window 85 showing the "Demo" dashboard which includes a Daily Revenue x Advanced Campaign visualization created by CDA in accordance with the above process, and displayed in chart field 79.

It should be understood that elements of the disclosed subject matter may also be provided as a computer program product which may include a machine-readable medium having stored thereon instructions which may be used to program a computer (e.g., a processor or other electronic device) to perform a sequence of operations, such as those described above. Alternatively, the operations may be performed by a combination of hardware, firmware, and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method for creating a marketing analytic dashboard having one or more visualizations for a customer comprising:

providing a graphical user interface (GUI) that allows one or more users working in a notebook computing system environment to generate a source notebook that includes a plurality of cells, each containing code, for the one or more visualizations each including a chart, the GUI allowing the one or more users to run the cells in the notebook computing system environment before creating the marketing analytic dashboard, wherein running the cells creates a global variable containing properties of each chart;

stringing together the code used to generate the one or more visualizations into a custom dataframe;

pairing the custom dataframe with chart properties associated with each visualization;

responsive to first input to the GUI by the one or more users, processing each of the custom dataframe and chart property pairs by an engine to create a preview of each visualization of the marketing campaign dashboard using marketing campaign data of the customer; and responsive to second input to the GUI by the one or more users, making the marketing analytic dashboard accessible to the customer through a customer-facing marketing analytics application, the global variable being used in the marketing analytic dashboard to perform the same processing as the engine on each of the custom dataframe and chart property pairs in order to create each visualization of the marketing campaign dashboard using updated marketing campaign data of the customer covering a specified time period.

2. The computer-implemented method of claim 1 wherein the marketing campaign data is streamed from a plurality of different cloud-based sources to a data warehouse, the data warehouse being accessible to the engine and the customer-facing marketing analytics application.

3. The computer-implemented method of claim 1 wherein the GUI is configured to allow the one or more users to replace an existing dashboard with the marketing analytic dashboard.

4. The computer-implemented method of claim 1 wherein the GUI is configured to allow the one or more users the option to make a group of dashboards based off the source notebook.

5. The computer-implemented method of claim 1 wherein the GUI is configured to allow the one or more users to add one or more filters to the marketing analytic dashboard.

6. The computer-implemented method of claim 1 wherein the GUI is configured to provide a window on a display, the window including a sidebar area with a list of charts to be included in the marketing analytic dashboard, the GUI providing a dashboard preview of a visualization in a chart area of the window responsive to one or more of the users clicking on a chart in the sidebar area that corresponds to the visualization.

7. The computer-implemented method of claim 1 wherein the second input comprises the one or more users clicking on a create button in a window of the GUI.

8. The computer-implemented method of claim 1 wherein the engine comprises a Julia engine.

9. The computer-implemented method of claim 1 wherein the source notebook comprises a Jupyter notebook.

* * * * *